No. 894,991. PATENTED AUG. 4, 1908.
F. A. WARREN, Jr.
ONE WAY CLUTCH.
APPLICATION FILED MAY 12, 1908.

2 SHEETS—SHEET 1.

WITNESSES
M. A. Atwood
Frank G. Parker

INVENTOR
Fred A. Warren Jr.
By his Atty.
Henry W. Williams

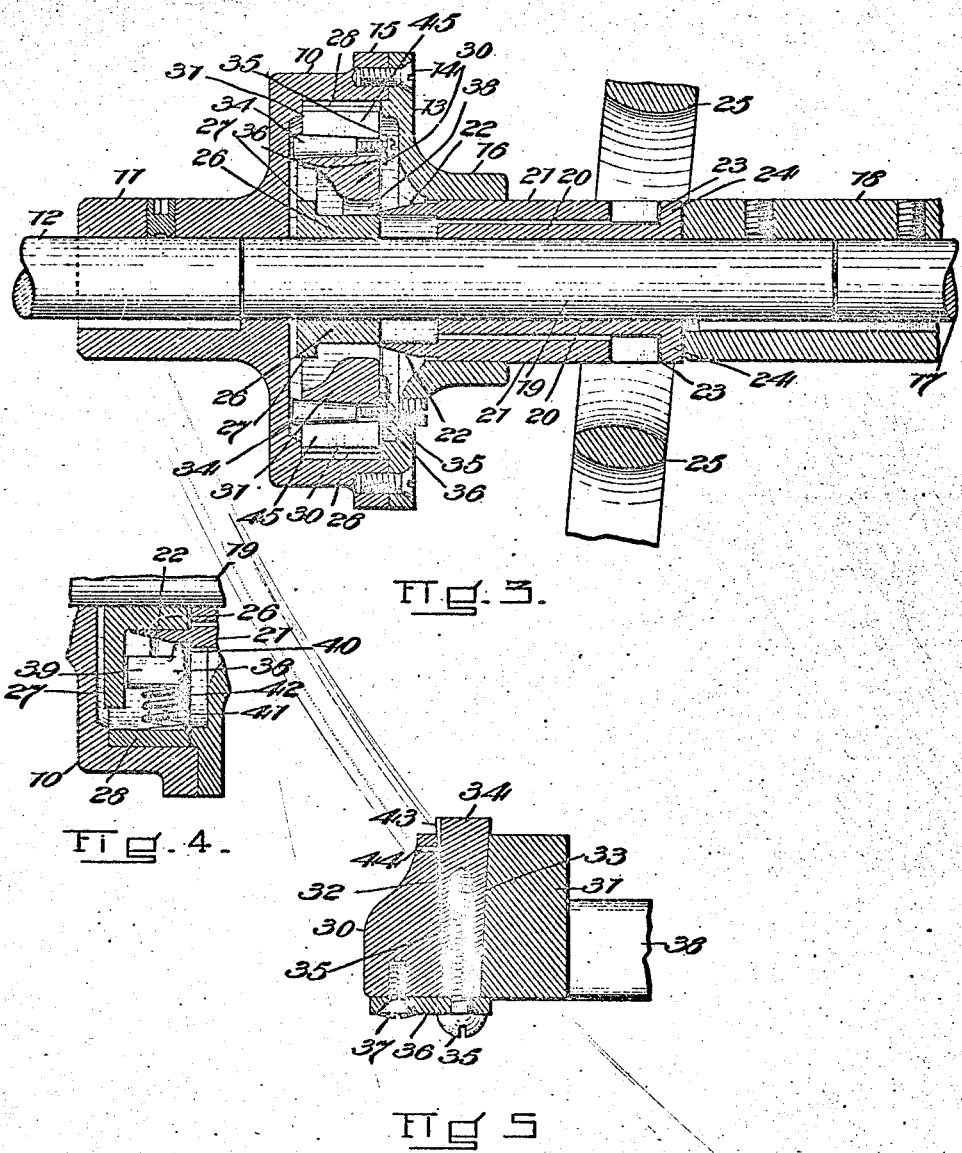

UNITED STATES PATENT OFFICE.

FRED A. WARREN, JR., OF PEABODY, MASSACHUSETTS, ASSIGNOR TO THE MARINE HARDWARE COMPANY, OF PEABODY, MASSACHUSETTS, A CORPORATION OF MAINE.

ONE-WAY CLUTCH.

No. 894,991.

Specification of Letters Patent.

Patented Aug. 4, 1908.

Application filed May 12, 1908. Serial No. 432,366.

*To all whom it may concern:*

Be it known that I, FRED A. WARREN, Jr., a citizen of the United States, residing in Peabody, in the county of Essex and State of Massachusetts, have invented a new and useful Improvement in One-Way Clutches, of which the following is a specification.

This invention relates to certain improvements in that class of one-way clutches which are adapted particularly for use in connection with marine engines, although the improved one-way clutch thus produced may be used in connection with other engines or machinery.

The invention consists of a certain novel construction and combination of parts fully described below, and illustrated in the accompanying drawings, in which:—

Figure 1:
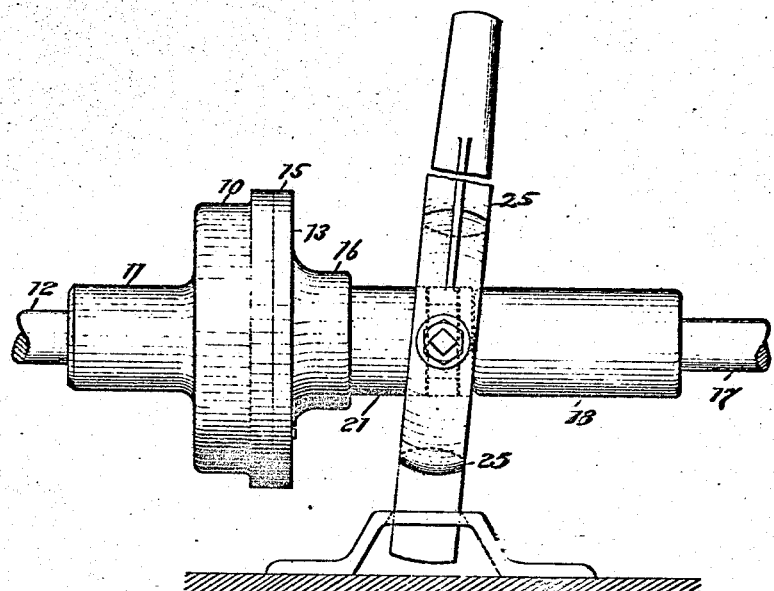
Figure 2:
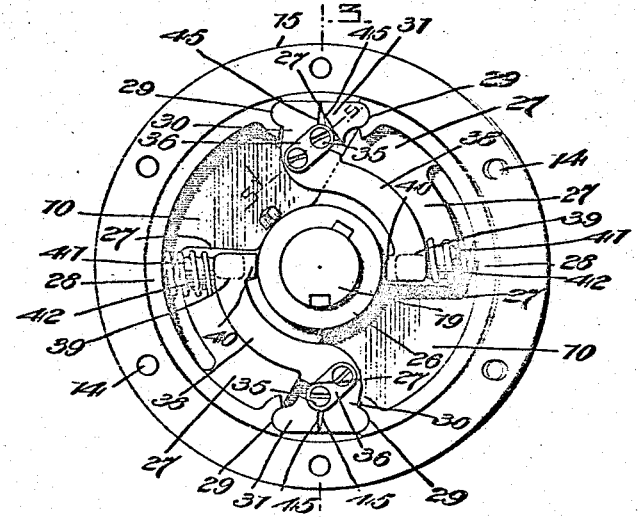

Figure 1 is a side elevation of the invention. Fig. 2 is an inside view with the plate removed, looking toward the left. Fig. 3 is a section taken on line 3—3, Fig. 2. Fig. 4 is a detail in section showing one of the toggles expanded and the clutch in operative position. Fig. 5 is an enlarged vertical detail taken on line 5—5, Fig. 2.

Similar characters of reference indicate corresponding parts.

Reference numeral 10 represents a circular case integral with a hub or collar 11 rigid on the shaft 12 which is driven by the engine, and 13 is a plate screwed at 14 to the flange 15 on the case, and provided with an annular flange or hub 16.

17 represents the shaft which transmits motion to the propeller (if the clutch is used in connection with a marine engine) said shaft being rigid in a sleeve 18 in which is rigidly held a stub-shaft 19 which is disposed between the inner ends of the shafts 12 and 17. A sleeve 20 is disposed non-rigidly on the shaft 19, and a tubular cone or sleeve 21 provided with a tapered end 22 is rigid on the sleeve 20, the cone 21 being shorter than the sleeve 20 and so disposed thereon as to leave an annular groove or channel 23 between the non-tapered end of the cone and a flange 24 on the outer end of the sleeve 20, said annular groove or channel being adapted to provide means of engagement for a lever 25 in the usual manner, whereby the cone 21, 22 may be moved endwise on the shaft 19.

26 is a hub rigid on the shaft 19, and integral or rigid with said hub are two wing-shaped substantially radial plates 27. Each of these wing-shaped plates has rigidly secured to its outer edge an arc-shaped plate or yoke, the two constituting a clutch-member 28 adapted to be expanded against the inner surface of the case 10, both parts of said clutch-member or yoke being concentric with the inner surface of said case, and normally very near but not in actual contact therewith. The ends of both these parts 28 are thickened and provided with curved recesses at 29, and the ends of one part are at sufficient distance from the ends of the other part to allow of toggles each of which consists of two members or levers 30 and 31 whose heels or outer ends are curved to fit said recesses in such a manner that they can turn or swing therein. The adjacent ends of the two members 30 and 31 of each toggle are provided with oppositely curved grooves 32 and 33, said grooves deepening on opposite inclines, as illustrated in Figs. 3 and 5, thereby fitted to receive a conical or tapered pivot 34 which is bored and threaded to receive an adjusting-screw 35 which extends from a bar 36 screwed at 37 to the member 30 of the toggle. The member 30 of each toggle is provided with an integral arm 38, of the shape shown in Fig. 3, said arm extending from such member across the inner end of the opposite member, and being formed at its opposite end with a projection 39 which extends at right angles therewith toward the inner face of one of the wings 27, as indicated in dotted lines in Fig. 2 and in full lines in Fig. 4. The inner end of each of said arms 38 is furthermore provided with a projection 40 which bears normally (that is, when the clutch is out of engagement), against the hub 26, being held in such position by a spiral spring 41 which surrounds a screw or pin 42 rigid with the arm and is held partly contracted between said arm and the inner surface of the adjacent curved plate or clutch-member 28. Each tapered pivot-pin 34 is provided with a longitudinal groove 43 into which there extends a pin 44 secured in the member 30 of the adjacent toggle. It will be noticed that when the toggles are in their normal positions their adjacent edges 45 are beveled apart toward the inner ends of the toggle-members, and preferably the grooves 32 and 33 are diagonally opposite each other.

When the parts are in the position illustrated in Figs. 1, 2 and 3, the clutch is out of engagement, and the shaft 12, which is in connection with the power, is running freely, as is also the case 10, 13. In these figures the clutch-mechanism is not expanded, the parts 28 being concentric with and out of contact with the case, and the tapered sleeve or cone 21 being to the right of and out of engagement with the portions 40 of the curved arms 38; and the stub-shaft 19, the sleeve 18 and the shaft 17 which is connected with the propeller, are stationary. By moving the lever 25 toward the left, the tapered end 22 of the cone 21 is forced around and across the hub 26 to or toward the central portion of the radial plates 27, as illustrated in Fig. 4, and the projections 40 are spread, forcing outward the inner ends of the curved arms 38 against the power of the springs 41, swinging outward the ends of the toggle-members 30 and by means of the tapered pivots 34 swinging outward the ends of the toggle-members 31, thus causing the toggle 30, 31 to straighten or be forced outward until its inner edges 45 approach a parallel position, with the effect that the adjacent edges of the arc-shaped plates or yokes 28 are forced apart and their outer surfaces are forced outward into engagement with the inner surface of the case 10, which imparts rotation to said arc-shaped plates or yokes 28, and thence through the radial or wing-shaped plates 27 to the stub-shaft 19 which by means of the coupling 18 imparts rotation to the shaft 17 connected with the propeller.
The projections 39 by bearing against the plates 27 prevent straining or bending of the arms 38. By means of the tapered pivot-pins 34 in the oppositely inclined grooves 32, 33, and the adjusting-screws 35, the wear can be taken up easily when it becomes desirable.

Having thus fully described my invention, what I claim, and desire to secure by Letters Patent, is:—

1. In a clutch-mechanism of the character described, a substantially circular case adapted to be rigidly connected with a driving-mechanism, a shaft in said case adapted to be connected with the mechanism to be driven, a hub rigid on said shaft, radial plates rigid with said shaft, arc-shaped gripping-plates supported by said radial plates and substantially concentric with the inner surface of the case, toggles intermediate of and connecting the ends of each plate with the ends of the other plate, arms extending from one of the members of each toggle to the hub, means for holding the inner end of said arm against the hub, a cone or tapered sleeve adapted to slide on the shaft and with its tapered end of somewhat larger diameter than that of said hub, and means for sliding the tapered end of said sleeve between the hub and the inner ends of said arms, thereby expanding the toggles and forcing the curved gripping-plates into engagement with the inner surface of the case, for the purpose set forth.

2. In a clutch-mechanism of the character described, a substantially circular case adapted to be rigidly connected with a driving-mechanism, a shaft in said case adapted to be connected with the mechanism to be driven, a hub rigid on said shaft, radial plates rigid with said shaft, arc-shaped gripping-plates supported by said radial plates and substantially concentric with the inner surface of the case and provided with grooved ends, toggles intermediate of and connecting the ends of each plate with the ends of the other plate, the outer ends of the toggles fitting and moving in the adjacent grooved ends of said plates, arms extending from one of the members of each toggle to the hub, means for holding the inner end of said arm against the hub, a cone or tapered sleeve adapted to slide on the shaft and with its tapered end of somewhat larger diameter than that of said hub, and means for sliding the tapered end of said sleeve between the hub and the inner ends of said arms, thereby expanding the toggles and forcing the curved gripping-plates into engagement with the inner surface of the case, for the purpose set forth.

3. In a clutch-mechanism of the character described, a substantially circular case adapted to be rigidly connected with a driving-mechanism, a shaft in said case adapted to be connected with the mechanism to be driven, a hub rigid on said shaft, radial plates rigid with said shaft, arc-shaped gripping-plates supported by said radial plates and substantially concentric with the inner surface of the case, toggles intermediate of and connecting the ends of each plate with the ends of the other plate, the inner or adjacent ends of the members constituting the toggles being provided with opposite curved grooves deepening at opposite inclines, tapered pins disposed in said grooves, means for adjusting said pins, an arm extending from one of the members of each toggle to the hub, means for holding the inner end of said arm against the hub, a cone or tapered sleeve adapted to slide on the shaft and with its tapered end of somewhat larger diameter than that of said hub, and means for sliding the tapered end of said sleeve between the hub and the inner ends of said arms, thereby expanding the toggles and forcing the curved gripping-plates into engagement with the inner surface of the case, for the purpose set forth.

4. In a clutch-mechanism of the character described, a substantially circular case adapted to be rigidly connected with a driving-mechanism, a shaft in said case adapted to be connected with the mechanism to be driven, arc-shaped gripping-plates substantially concentric with the inner surface of the case, means for supporting said gripping-plates intermediate of the plates and the shaft, toggles intermediate of and connecting the ends of each gripping-plate with the ends of the other plate, the inner adjacent ends of the members of the toggles being provided with oppositely inclined curved grooves, tapered pivot-pins in said grooves, means for adjusting said pivot-pins, and mechanism for expanding the toggles and forcing the gripping-plates against the inner surface of the case, for the purpose set forth.

In testimony whereof I have signed my name to this specification in the presence of two subscribing witnesses.

FRED A. WARREN, Jr.

Witnesses:
HENRY W. WILLIAMS,
M. A. ATWOOD.